Figure 4:
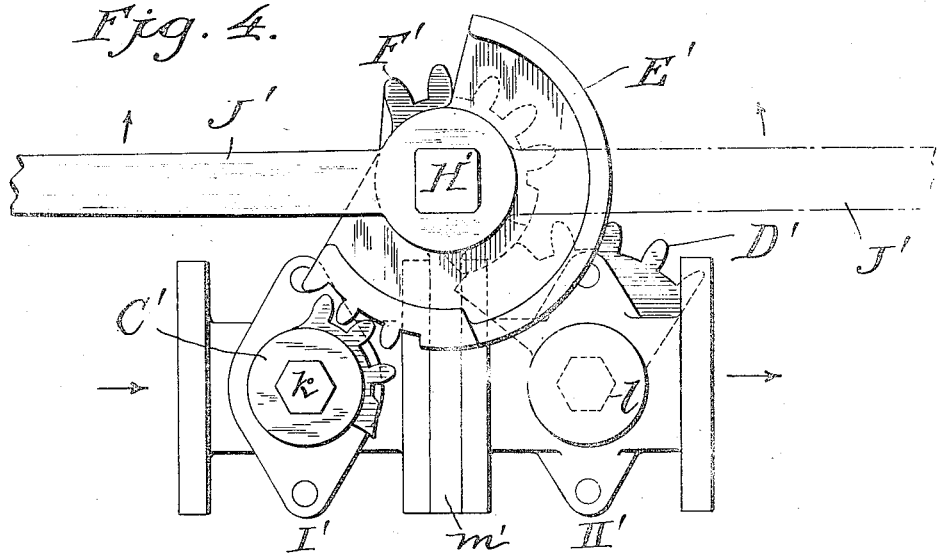

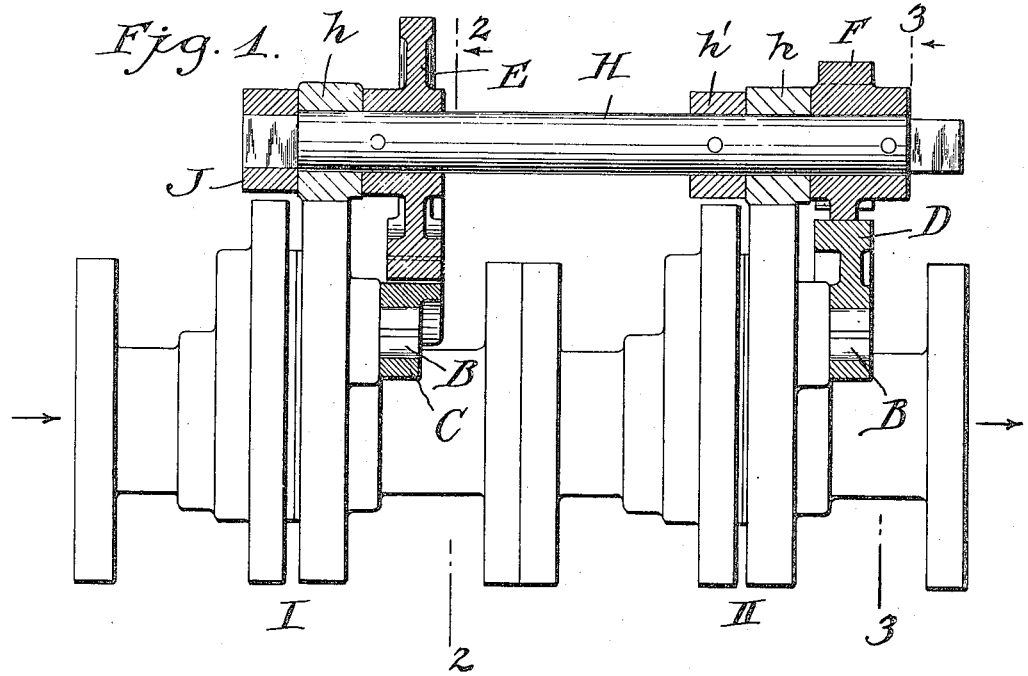
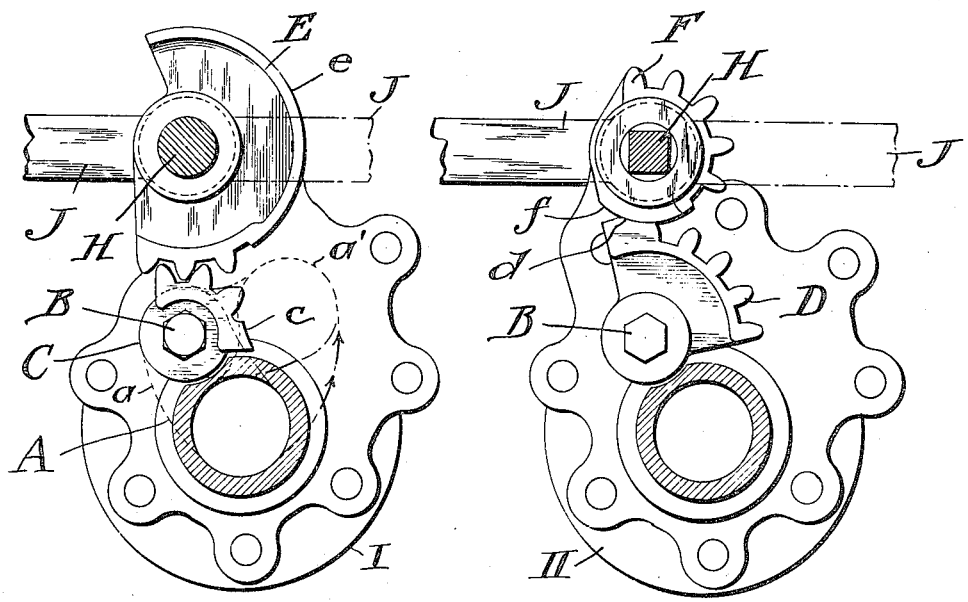

W. G. WILSON.
VALVE CONTROL.
APPLICATION FILED MAR. 30, 1917.

1,256,759.

Patented Feb. 19, 1918.
2 SHEETS—SHEET 2.

Inventor
Wylie G. Wilson.
By his Attorneys

UNITED STATES PATENT OFFICE.

WYLIE GEMMEL WILSON, OF NEW YORK, N. Y., ASSIGNOR TO EVERLASTING VALVE COMPANY, A CORPORATION OF NEW YORK.

VALVE CONTROL.

1,256,759.

Specification of Letters Patent. Patented Feb. 19, 1918.

Application filed March 30, 1917. Serial No. 158,630.

*To all whom it may concern:*

Be it known that I, WYLIE GEMMEL WILSON, a subject of the King of Great-Britain, and a resident of New York city, in the county of New York and State of New York, have invented certain new and useful Improvements in Valve Controls, of which the following is a specification.

This invention relates to valve controlling means and is particularly adapted for use in controlling valves mounted in tandem governing boiler blow-offs.

In the operation of boilers, particularly such as are used in large installations, it is usual to blow off the mud and scale deposits at intervals during a day's run. Under the best engineering practice, it is customary to interpose in the blow-off pipe two valves for controlling the pressure in the blow-off pipe, one valve adjacent the boiler and the other valve farther removed therefrom. These valves may be of any of the usual types, but frequently they are of the type known as slide valves, wherein the valve slides into a pocket or sleeve adapted to receive the same. Of course, any form of valve may be used in this connection, but whatever form of valve is used the following phenomenon is familiar to engineers.

When steam or hydraulic pressure is lying behind a closed valve, and the valve is opened, there is a moment during the operation of opening when a very slender aperture permits the fluid under pressure to be forced through between the valve and the valve seat. The passage of the fluid under these conditions is liable to injure the valve in a way which is technically known as "wire drawing"; that is to say, the edge of the valve and the valve seat are affected either by the fluid passing through the same or by particles of grit or metal in suspension in the fluid, in such a way that the surfaces of the metal are drawn, *i. e.*, displaced, so that, when the valve and valve seat are again brought together, they do not absolutely fit and, in such case, a small leakage is apt to occur. This leakage, though very small, in the aggregate oftentimes impairs the efficiency of the plant so much that it is highly desirable to provide means by which said valves may be protected against such "wire drawing".

It is well known in engineering practice that the above described difficulty may be overcome by interposing two valves in the blow-off pipe, and operating said valves in the following sequence: When it is desired to blow off the boilers, the valve nearest the boiler is first opened to its full extent. It will be understood that the opening of this valve is not attended by the unfavorable conditions above recited, that is to say, of the rapid flow of the fluid through the valve at the time that it is first opened, for the reason that the valve is opened under conditions where the fluid is at rest, the flow of the fluid being checked by the second valve which is farthest from the boiler. It will be obvious, therefore, that, if the opening and closing of the valve nearest the boiler is accomplished when the fluid in the blow-off pipe is in a state of repose, the danger of injury to the valve and the valve seat above described is minimized, and, consequently, this valve may be used without damage for a considerable period of time and without impairment of its efficiency to positively check the flow of fluid through the blow-off pipe when such valve is closed.

When the valve nearest the boiler is thus opened, pressure then lies behind the second valve which is farthest from the boiler, and, on the opening of that valve, the blow-off is accomplished. Of course, the "wire drawing" effect and incidental damage to this valve is unavoidable, but, in view of the fact that the valve nearest the boiler, when closed, becomes a permanent seal, the fact that the second valve may be slightly damaged by the "wire drawing" effect, or otherwise, is not material, for the reason that all leakage is stopped by the first valve.

The foregoing facts are well known to engineers familiar with valve construction, and the same form no part of my present invention, except in so far as my present invention has for its purpose the providing of means for the automatic accomplishment of the desired results above stated.

It is the common experience of engineers that, while the above described principles are well known, it is very difficult to convey to the ordinary workmen in charge of the operation of such apparatus the importance of operating said valves in the sequence above described. In some instances, it is found that they will only use one valve, and, in other instances, they will use the valves in the wrong sequence, opening first the one farthest from the boiler and then the one nearest to the boiler. Hence, it is found that, notwithstanding the fact that two valves are provided, all of the damage incident to the operation of one valve is experienced.

The present invention is, therefore, designed to overcome these difficulties in such a way that it will be impossible to operate the two valves otherwise than in the sequence which is found to be the best under the circumstances as above stated.

With the foregoing in mind, the object of the present invention is to provide means whereby two valves, coupled in tandem, may be operated to successively open and close through the actuation of unitary means. That is to say, the means which controls one of the valves simultaneously controls the other, so that neither one of said valves can be operated, to the exclusion of the other, during the blowing-off operation, but, at all times, said valves operate in a predetermined sequence, no more labor being required by the operator than was heretofore required for the operation of a single valve.

In one of its preferred practical embodiments, the invention embodies a pair of valves coupled in tandem, valve-actuating mechanism adapted to control both valves, and unitary means, adapted to be manipulated by the operator, for operating the valve-actuating mechanism, whereby both of said valves are controlled through the actuation of such unitary means.

Features of the invention, other than those specified, as well as the advantages thereof, will be apparent from the hereinafter detailed description taken in conjunction with the accompanying drawings.

In the accompanying drawings I have illustrated different practical embodiments of the invention, but the constructions therein shown are to be understood as illustrative, only, and not as defining the limits of the invention.

Figure 1 is a side elevation of two valves coupled in tandem, said view illustrating, in section, means, embodying the present invention, for operating said valves in predetermined sequence.

Figs. 2 and 3 are transverse sections taken in the planes of the lines 2—2 and 3—3, respectively, of Fig. 1.

Figure 5:
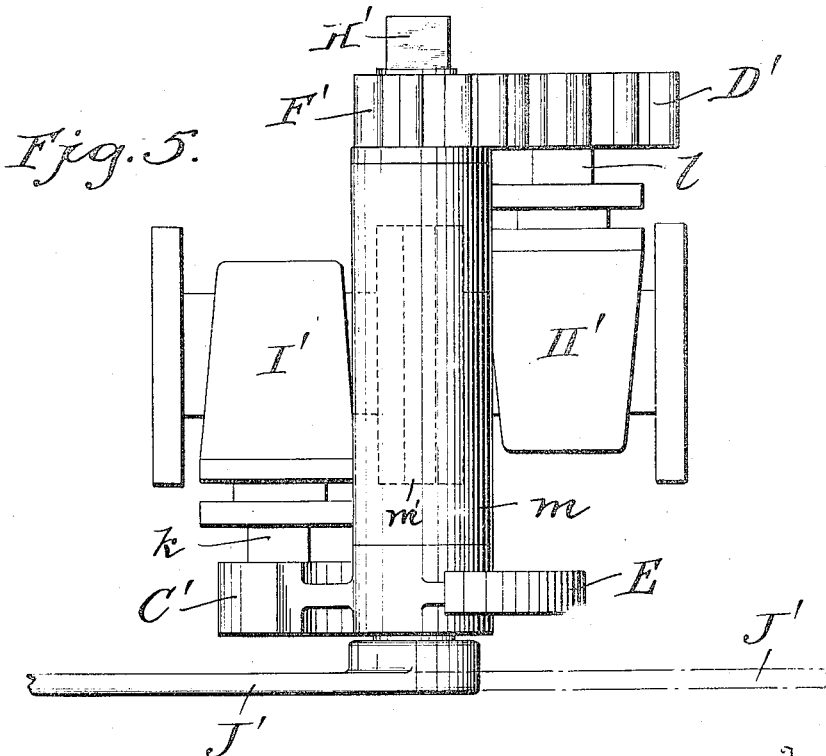

Fig. 4 is a view similar to the showing of Fig. 1, but illustrating a modified form of the invention, all of the parts of which are shown in elevation, and Fig. 5 is a plan view of the structure of Fig. 4.

Referring to the drawings, and more particularly to Figs. 1 to 3, wherein the preferred embodiment of the invention is shown, I and II designate two valves, which are coupled in tandem and are adapted to be included in the blow-off pipe of a steam boiler, with valve I nearest the boiler. These valves may be of any well known type, but, in the form shown, each is of the well known and popular type known to the trade as the "Everlasting valve." These valves are slide valves, embodying, generally, a valve A, mounted for oscillating movement, on a stub-shaft B, from the dotted line position, $a$, shown in Fig. 2, wherein the passage of fluid through the valve casing is precluded, to the dotted line position shown at $a'$, Fig. 2, to allow of the flow of fluid through the casing. In practice, a lever, wrench, or key, is generally applied to the stub-shaft B for the purpose of imparting such oscillatory movement to valve A.

In accordance with the present invention, however, stub-shaft B of each of the valves I and II is provided with a gear-toothed sector, sector C being mounted on the stub-shaft B of valve I and sector D being fixed on the stub-shaft B of valve II. With sectors C and D coöperates a pair of additional sectors E and F, respectively, both of which are fixed on a common rock-shaft H, extending in parallel relation to the axes of rotation of the stub-shafts B, and journaled for rotation in lugs $h$, one of which is formed on each of the valves I and II. A collar $h'$ is provided on rock-shaft H to preclude longitudinal movement of said rock-shaft in its bearings. Oscillatory movement is imparted to the rock-shaft through the medium of an operating wrench or key J, coöperating with either end of the rock-shaft for the purpose of actuating sectors E and F, and, through their coöperation with the sectors C and D, respectively, imparting movement to valves A to control the flow.

It will be noted, from Fig. 2, that the coöperating sectors C and E are not toothed throughout their entire circumferences, but for only portions thereof, the remaining portions of the circumferences being formed free of teeth. Thus, sector E is provided, for the greater part of its circumference, with an arcuate surface $e$, concentric with the axis of rotation of the sector, while sector C is provided with an acuate surface $c$, complementary to the arcuate surface $e$ of sector E. Consequently, when sectors C and E are actuated, movement will be transmitted to the former as long as its teeth are in engagement with the teeth of the latter, but, after the surface c has come into engagement with surface e, sector C will remain locked in fixed position during the subsequent operations of sector E. For example, valve A is shown closed in Fig. 2, under which condition the operating handle J will be in substantially the horizontal position shown in full lines. If this operating handle is now rotated, in clockwise direction, to the dotted line position of said figure, sector E will, during the early part of its travel, operate sector C, because of the meshing teeth of said parts, but, during the latter part of its travel, the surface c will engage with the surface e, so that sector C will be locked against movement. The relationship between the parts is such that the movement imparted to valve A, before the same is locked, will be sufficient to shift valve A to its open position a'. When handle J is subsequently returned from the dotted line position of Fig. 2 to the full line position thereof, the operations described will be reversed to leave valve A in closed position.

As shown in Fig. 3, sectors D and F, which serve to control valve II, are formed very similar to sectors C and E, sector F having a plurality of teeth and a sliding surface f, while sector D has a complementary sliding surface d, in addition to a plurality of teeth adapted to coöperate with the teeth of sector F. Sectors D and F are, however, so constituted and mounted that, through the first part of the movement of the operating lever J, the surfaces d and f are in engagement and sector D locked against movement. It is not until during the latter part of the travel of the operating handle J to the dotted line position, that the teeth of said sectors mesh and the opening of valve II takes place.

Accordingly, as valve I is opened and locked open, during the first part of the travel of handle J, and valve II opened, and locked open, during the latter part of the movement of said handle, valve I will be entirely open before valve II starts to open, and, in the subsequent closing operations of the valves, valve II will be closed tight before valve I starts to close. It will, moreover, be obvious that the entire operation of opening the two valves in sequence is accomplished through one continuous motion of handle J, and that the closing of the valves in reversed sequence is obtained by one continuous motion of the handle in the opposite direction.

The result of this construction is that valve I is opened during a still condition of the fluid, which is held in check by valve II until said valve I is entirely opened. In the closing operations, valve I is not closed until valve II has been fully closed, so that said valve I is, during this operation, closed while the fluid is still. Valve I is, therefore, not subjected, at any time, to the scouring action of the fluid, and the "wire drawing" of said valve, with consequent leakage, is entirely obviated. It is true that, through continued use, valve II will become worn, "wire drawn" and leaky, but, as the tight sealing of the draw-off pipe is accomplished through valve I, and valve II used only to back up the flow and produce a substantially still condition thereof during the opening and closing operations of valve I, valve II may be very leaky and still perform its function with great efficiency. Furthermore, if valve II becomes very badly worn or is disabled in any way, said valve II may be removed and a new valve inserted in lieu thereof, while valve I is closed, without necessitating the shutting down of the boiler.

In the construction of Figs. 4 and 5, the invention is shown in a modified form as applied to a pair of ordinary plug stopcocks I' II'', connected in tandem. On the valve stem k of valve I' is a sector C', corresponding to sector C, hereinbefore described, and upon the valve stem l of valve II' is a sector D', corresponding to sector D. With sector C' coöperates a sector E', corresponding to sector E, and with sector D' coöperates a sector F', corresponding to sector F. Sectors E' and F' are fixed on rock-shaft H', which, because of the particular placement of the valve stems in this form of valve, is disposed at right angles to the flow of the fluid through the valves, i. e., in parallel relation to the valve stems. Shaft H' may be conveniently journaled in a bearing m, supported on a plate m', which may be clamped between the adjacent flanges of the two valves I' II'. Rock-shaft H' is actuated, in the same manner as rock-shaft H, by means of a suitable handle, key or hand-wheel, J', affixed thereto.

As the sectors entering into the construction of Figs. 4 and 5 are formed and operated in substantially the same way as described with respect to the construction of Figs. 1 to 3, inclusive, it will be manifest that valve I' is opened before valve II', and valve II' closed before valve I', in the same sequence and manner as have hereinbefore been described with respect to the operations of valves I and II.

From what has been said, it will appear that valves I and I' are opened and closed during a still condition of the fluids which they control, so that the valve seats or the valves, themselves, are never exposed to any chance of injury by the quick flow of fluid. Said valves will thus remain tight and form the proper seal which is necessary to the maximum efficiency of the boiler with which they are associated.

A salient feature of the foregoing construction is that it is impossible for an engineer, or other operator, to fail to operate the tandem valves in proper sequence, or either one to the exclusion of the other. The valves must be operated properly during each blow-off operation, so that the present invention entirely overcomes the deleterious practice by operators of employing only one valve, as hereinbefore described.

For the purposes of illustration, the present invention has been shown and described as applied to two different types of valve, but it will be understood that it is adapted to be employed with valves of widely varying types, and, while it has been disclosed in its adaptation to boiler blow-off control, it may be availed of in other environments.

An important practical advantage inherent in the present invention resides in the fact that stock valves may be employed. In other words, the valves which are connected in tandem are two well known forms of valve. In the construction of Fig. 1, the valves are of the "Everlasting" type and are of the same structure as is employed for other purposes, while the same facts are true of the other form of valve shown in the drawings. Thus, in practice, if the structure of this invention is to be installed, a workman may take two well known forms of stock valve, couple them in tandem, and associate the common operating means therewith. By employing stock valves, a great saving in the cost of production results, since the manufacture of valves of a particular and complicated character is rendered entirely unnecessary. Moreover, by coupling the valves I and II in tandem, valve II may be removed for repair at any time, valve I serving to seal the common conduit until valve II is again coupled up.

It has been heretofore suggested to form two distinct valve seats and coöperating sealing elements within a common casing, the object being that the leakage of one valve will be stopped by the other. Structures of this character are, however, complicated in their character, require their own particular type of intricate casting, and are expensive to manufacture. Moreover, as valves of this character are associated with conduits of widely varying sizes, a large assortment of these sizes must necessarily be carried on hand by manufacturers. The present invention overcomes the difficulties and expense incident to the use of prior art valves of the character described, through the employment of stock valves which do not require intricate elements of casting, and which are relatively cheap and may always be had.

Having thus fully described the invention, what I claim as new, and desire to secure by Letters Patent, is:

1. A structure of the class described embodying a pair of valves coupled in tandem, a driven sector associated with the sealing element of each valve, a driving sector coöperating with each driven sector, said coöperating sectors being formed to lock the sealing element of one valve in closed position until the sealing element of the other valve is in open position, and to unlock and close said first locked sealing element before the other sealing element is unlocked and closed, and means for actuating said driving sectors.

2. A structure of the class described embodying a pair of valves coupled in tandem, a driven sector associated with the sealing element of each valve, a driving sector coöperating with each driven sector, said coöperating sectors being formed to lock the sealing element of one valve in closed position until the sealing element of the other valve is in open position, and to unlock and close said first locked sealing element before the other sealing element is unlocked and closed, a common rock-shaft for operating both of the driving sectors, and means for oscillating the rock-shaft.

3. A structure of the class described embodying a pair of valves coupled in tandem, a driven sector associated with the sealing element of each valve, a driving sector coöperating with each driven sector, said coöperating sectors being formed to lock the sealing element of one valve in closed position until the sealing element of the other valve is is open position, and to unlock and close said first locked sealing element before the other sealing element in unlocked and closed, a common rock-shaft for operating both of the driving sectors, and unitary means for manually oscillating said rock-shaft.

4. A structure of the class described embodying two valves having a rotary operative means, said valves interposed in one and the same conduit, in combination with means to rotate both of said valve operating means and lock and unlock the same in one and the same cycle of its rotary movement, to first open the first of said valves, and lock the same, second to open the second of said valves and lock the same, and third to unlock and close the second of said valves, and lock the same, and fourth to unlock the first of said valves and close the same.

5. In an arrangement of the character described, a complete operable valve embodying a valve casing, sealing means positioned therein, and a member for imparting movement to the sealing means, a second complete valve embodying a valve casing, sealing means positioned therein, and a member for imparting movement to the sealing means, and means for coupling said first and second valves together in tandem in a common conduit, in combination with common actuating means to operate both of said members, said actuating means operating, first, to open the first valve while the second valve is maintained closed, second, to open the second valve while the first is maintained open, third, to close the second valve while the first is maintained open, and, fourth, to close the first valve while the second is maintained closed.

6. In an arrangement of the character described, a complete operable valve embodying a valve casing, sealing means positioned therein, and a member for imparting movement to the sealing means, a second complete valve embodying a valve casing, sealing means positioned therein, and a member for imparting movement to the sealing means, and means for coupling said first and second valves together in tandem in a common conduit, in combination with common actuating means to operate both of said members, said actuating means operating, first, to open the first valve and lock said first valve open while the second valve is maintained closed and locked closed, second, to open the second valve while the first is maintained open and locked open, third, to close and lock the second valve while the first is maintained locked open, and, fourth, to close the first valve while the second is maintained closed and locked.

7. In an arrangement of the character described, a complete operable valve embodying a valve casing having a straight-through duct, sealing means for sealing said duct, and a member for imparting movement to said sealing means, a second complete valve embodying a valve casing having a straight-through duct, sealing means for sealing said duct, and a member for imparting movement to said second sealing means, and means for coupling said valves together in a common conduit, with the straight-through ducts of both valves in alinement with the common conduit, in combination with common actuating means for operating both members, said actuating means operating, first, to open the first valve while the second valve is maintained closed, second, to open the second valve while the first is maintained open, third, to close the second valve while the first is maintained open, and, fourth, to close the first valve while the second is maintained closed.

8. In an arrangement of the character described, a complete operable valve embodying a valve casing, sealing means positioned therein, a member for imparting movement to the sealing means, and a driven sector associated with said member, and a second complete operable valve embodying a casing, sealing means therein, a member for imparting movement to the sealing means, and a second driven sector associated with said member, said two valves being coupled in tandem in a common conduit, in combination with a driving sector coöperating with each driven sector, and means for actuating the sectors, first, to open the first valve while the second valve is maintained closed, second, to open the second valve while the first is maintained open, third, to close the second valve while the first is maintained open, and, fourth, to close the first valve while the second is maintained closed.

9. In an arrangement of the character described, a complete operable valve embodying a valve casing, sealing means positioned therein, a member for imparting movement to the sealing means, and a driven sector associated with said member, and a second complete operable valve embodying a casing, sealing means therein, a member for imparting movement to the sealing means, and a second driven sector associated with said member, said two valves being coupled in tandem in a common conduit, in combination with a driving sector coöperating with each driven sector, and a common rock-shaft on which both driving sectors are mounted in such relation that, when operated, the sectors serve, first, to open the first valve while the second valve is maintained closed, second, to open the second valve while the first is maintained open, third, to close the second valve while the first is maintained open, and, fourth, to close the first valve while the second is maintained closed.

10. In an arrangement of the character described, a complete operable valve embodying a valve casing, sealing means positioned therein, a member for imparting movement to the sealing means, and a driven sector associated with said member and provided with a locking portion, and a second complete operable valve embodying a casing, sealing means positioned therein, a member for imparting movement to the sealing means, and a second driven sector associated with said member and provided with a locking portion, said two valves being coupled in tandem in a common conduit, in combination with a driving sector coöperating with each driven sector, each of which driving sectors is provided with a locking portion adapted to coöperate with the locking portions of the driven sectors, and means for actuating the sectors, first, to open the first valve and lock said first valve open while the second valve is maintained closed and locked closed, second, to open the second valve while the first is maintained open and locked open, third, to close and lock the second valve while the first is maintained locked open, and, fourth, to close the first valve while the second is maintained closed and locked.

11. In an arrangement of the character described, a complete operable valve embodying a valve casing, sealing means positioned therein, and a member for opening said sealing means, and a second complete operable valve embodying a valve casing, sealing means positioned therein, and a member for opening said sealing means, in combination with a unitary prime mover for operating both valves, and driving connections between said prime mover and the operating members of the valves, said driving connection being constituted to lock the second valve against opening until the first is open, and to lock the first open until the second is closed, but to allow of both valves being either open or closed at the same time.

12. In an arrangement of the character described, a complete operable valve embodying a valve casing, sealing means positioned therein, and a member for opening said sealing means, and a second complete operable valve embodying a valve casing, sealing means positioned therein, and a member for opening said sealing means, in combination with a unitary prime mover for operating both valves, driving connections between said prime mover and the operating members of the valves, and means associated with the driving connections to lock the second valve against opening until the first is open, and to lock the first open until the second is closed, but to allow of both valves being either open or closed at the same time.

13. In an arrangement of the character described, a complete operable valve embodying a valve casing, sealing means positioned therein, and a member extending exteriorly of said casing for imparting movement to the sealing means, and a second complete operable valve embodying a valve casing, sealing means positioned therein, and a member extending exteriorly of said casing for imparting movement to the sealing means, said two complete valves being coupled in tandem in a common conduit, in combination with valve operating means positioned entirely exterior of the valve casings and coöperating with the operating members of the valves, said means being operable, first, to open the first valve while the second valve is maintained closed, second, to open the second valve while the first is maintained open, third, to close the second valve while the first is maintained open, and, fourth, to close the first valve while the second is maintained closed.

14. In an arrangement of the character described, a pair of slide valves having straight-through fluid passages, the casing of one of which is entirely separate and distinct from the casing of the other, said valves being coupled in tandem in a common conduit, with the straight-through passages of said valves in alinement with one another and with the common conduit, in combination with common actuating means to operate both slide valves, said actuating means operating, first, to open the first valve while the second valve is maintained closed, second, to open the second valve while the first is maintained open, third, to close the second valve while the first is maintained open, and, fourth, to close the first valve while the second is maintained closed.

15. In an arrangement of the character described, two valves, each having operative means and both interposed in one and the same conduit, in combination with means between the operative means of said valves to lock the second valve closed until the first is fully open and to lock the first valve open until the second is entirely closed.

16. In an arrangement of the character described, a complete operable valve embodying a valve casing, sealing means positioned therein, and a member for operating said sealing means, and a second complete operable valve embodying a valve casing, sealing means positioned therein, and a member for operating said sealing means, in combination with means interposed between the operating members of said valves to lock the second valve against opening until the first is fully open, and to lock the first against closing until the second is fully closed.

17. In an arrangement of the character described, two valves both interposed in one and the same conduit and each having operative means, in combination with means associated with the operative means of each valve to lock one valve against opening until the other is entirely open, and to lock the second mentioned valve against closing until the first mentioned valve is entirely closed, whereby said valves are open and closed in inverse succession, both valves being adapted to be left open at the same time or closed at the same time.

18. In an arrangement of the character described, two valves, both of which are interposed in one and the same conduit and each of which has its own separate and independent operative means, in combination with means associated with the separate operative means of each particular valve to lock one of said valves against opening until the other is entirely open, and to lock the second mentioned valve against closing until the first is entirely closed.

19. In an arrangement of the character described, two valves, each having operative means and both interposed in one and the same conduit, in combination with means interposed between said valve operative means to operate the latter, such operation affecting the first valve first and until it is fully opened, and then affecting the second valve until it is fully opened, while, in reversing said operation, the second valve operative means is first affected until the valve is closed and then the first valve operative means is affected until said first valve is closed.

Signed by me at New York city, N. Y., this 16th day of March, 1917.

WYLIE GEMMEL WILSON.

Witnesses:
  ANNA F. DAVIDSON,
  MARGARET VOGEL.